United States Patent Office 3,124,596
Patented Mar. 10, 1964

3,124,596
ALKYLENE TRITHIOCARBONATES
Harry A. Stansbury, Jr., John A. Durden, Jr., and William H. Catlette, South Charleston, W. Va., assignors to Union Carbide Corporation, a corporation of New York
No Drawing. Filed Nov. 10, 1958, Ser. No. 772,693
6 Claims. (Cl. 260—327)

This invention relates to an improved process for producing valuable alkylene trithiocarbonates in good yields and high efficiencies by the reaction of carbon disulfide with alkylene oxides at elevated temperatures.

Alkylene trithiocarbonates comprise a valuable class of compounds. Ethylene trithiocarbonate is an effective flotation agent in the refining of copper ore. Substituted ethylene trithiocarbonates are good plasticizers for various resins. Ethylene trithiocarbonate and cyclohexene trithiocarbonate are effective stabilizers for alkoxyarylamines. Plywood adhesives having improved dry and wet strength are prepared by the addition of ethylene trithiocarbonate to the formulations; and chlorinated ethylene trithiocarbonate is a useful fungicide.

Present methods of preparing alkylene trithiocarbonates generally involve the interaction of carbon disulfide with an alkylene dihalide, alkylene oxide, alkylene halohydrin or alkylene glycol in the presence of at least two moles of a strong base such as potassium hydroxide. Large quantities of inorganic base are consumed, and it is necessary to extract the trithiocarbonate product from the inorganic salts and water which are formed during the reaction. For example, when ethylene chloride is reacted with carbon disulfide in the presence of potassium hydroxide, it is necessary to separate ethylene trithiocarbonate from potassium chloride, water and potassium monothiocarbonate by-products. A further disadvantage of the prior art methods is that they are not readily adaptable to continuous operation on a commercial scale.

Accordingly, it is an object of this invention to provide an improved process for producing alkylene trithiocarbonates from carbon disulfide and alkylene oxides which is adapted for continuous operation on a commercial scale.

Other objects and advantages will become apparent to those skilled in the art from the accompanying description and disclosure.

One or more objects of this invention are accomplished by a process which comprises reacting carbon disulfide at a temperature between 5° C. and 250° C. and a pressure between 30 and 1500 p.s.i. with an alkylene oxide corresponding to the formula:

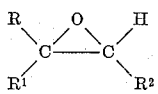

wherein R, $R^1$ and $R^2$ taken separately are selected from the group consisting of hydrogen, aliphatic, alicyclic and aromatic radicals and wherein $R^1$ and $R^2$ taken collectively is an alicyclic group. R, $R^1$ and $R^2$ can contain oxygen, nitrogen, halogen, silicon and sulfur, in addition to carbon and hydrogen.

Illustrative of preferred alkylene oxide derivatives corresponding to the above formula are those in which R, $R^1$ and $R^2$ taken separately are selected from the group consisting of hydrogen, alkyl, haloalkyl, alkenyl, haloalkenyl, alkyloxyalkyl, alkenyloxyalkyl, cycloalkyl, cycloalkenyl, heterocyclic, alkaryl, aralkyl and aryl radicals, and in which $R^1$ and $R^2$ taken collectively is an alicyclic or heterocyclic group.

It is particularly advantageous to employ alkylene oxide derivatives corresponding to the above formula in which R, $R^1$ and $R^2$ taken separately are selected from hydrogen, alkyl radicals containing between one and ten carbon atoms, and cyclopentyl, cyclohexyl and phenyl radicals, and $R^1$ and $R^2$ taken collectively is a cyclohexyl group.

The alkylene oxide derivatives which can be employed include ethylene oxide; propylene oxide; butadiene monoxide; isoprene oxide; 1,2-epoxybutane; 1,2-dichloro-3,4-epoxybutane; 2,3-epoxybutane; epoxyisobutylene; 3,4-epoxycyanocyclohexane; cyclohexene oxide; 1,2-epoxyhexane; 1,2-epoxyhexadecane; vinylcyclohexene monoxide; dicyclopentadiene monoxide; allyl glycidyl ether; methallylglycidyl thioether; allyl glycidyl acetal; glycidyl benzene; styrene oxide; 1,2-epoxy-2,4,4-trimethylpentane; divinylbenzene monoxide; divinylbenzene dioxide; 1-chloro-2,3-epoxycyclohexane; diethyl bis-(2,3-epoxypropxy)silane; cyclooctatetraene oxide; 2,5-dimethyl-5,6-epoxy-1-hexene; 1,4-dihydronaphthalene oxide; 2,3-epoxybutyl Cellosolve; α-pinene oxide; dipentene monoxide; α-terpineol oxide; 4-epoxyethyl-1,3-dioxane; and the like.

The alkylene oxide and carbon disulfide are reacted in a ratio to provide carbon disulfide in molar excess of the stoichiometric quantity required for reaction with the alkylene oxide. The quantity of carbon disulfide can vary from a slight molar excess up to a several-fold molar excess. A molar excess of alkylene oxide is avoided because it results in the formation of undesirable polymeric by-products.

The alkylene oxide and carbon disulfide are reacted at a preferred temperature in the range between 100° C. and 175° C. Reaction temperatures higher than 175° C. are generally less desirable, and temperatures in the vicinity of 250° C. and higher produce substantial quantities of non-distillable decomposition products. The pressure in the reaction system is generally at a level at least sufficient to maintain the reactants in a liquid phase. Preferably, the presssure of the system is maintained in the range between 30 and 1500 p.s.i., and an inert gas such as nitrogen is introduced into the system if necessary to achieve the desired pressure.

The process of this invention can be conducted without benefit of a catalyst; however, for optimum results, it is advantageous to include an organic nitrogen-base compound as a catalyst in the reaction medium. Amines are the preferred nitrogen-base catalyst. Alkyl tertiary amines are outstanding in their catalytic activity, and of the tertiary alkyl amines, trimethylamine is the most effective catalyst. Illustrative of the classes of nitrogen-base catalysts which can be employed are primary amines such as ethylamine, isopropylamine, butylamine, and the like; secondary amines such as dimethylamine, diethylamine, dibutylamine, piperidine, N-methylaniline, and the like; tertiary amines such as trimethylamine, triethylamine, tributylamine, triethylenediamine, N-methylmorpholine, N,N-dimethylaniline, N-methylpiperidine, and the like; and aromatic heterocyclic nitrogen-base compounds such as pyridine, 2-methyl-5-ethylpiperidine, piccoline, lutidine, and the like. The catalyst concentration can be varied between about 0.1 and 10 weight percent, based on the total weight of reactants, depending on such factors as the reaction temperature and the reactivity of a particular alkylene oxide being reacted.

The process can be conducted either batchwise or continuously. Suitable equipment for carrying out the process may be either a bomb-type reactor equipped with a stirrer, or a tube-type autoclave. Either type of equipment requires accessory feed tanks, pumps and control instruments for pressure and temperature. In a batch process, the reactants may be added in any order to a bomb-type reactor, and after a reaction period of between about ten minutes and one hundred minutes, the crude alkylene trithiocarbonate product is stripped of low boiling materials, and, if desired, purified by crystallization or by high vacuum distillation.

The process can be conducted most efficiently by continuously introducing separate streams of carbon disulfide and alkylene oxide into one end of a tubular autoclave, and continuously withdrawing the product mixture from the other end after a suitable residence time, e.g., fifteen minutes to an hour. Then the product mixture can be fed into a continuous still column, and the unreacted alkylene oxide and carbon disulfide are recovered separately from the alkylene trithiocarbonate product and recycled to the feed system of the autoclave. When a catalyst is employed it is preferred to enter it into the reaction system in the carbon disulfide feed stream. If desired, the carbonyl sulfide which is produced as a byproduct can be partially converted to carbon disulfide by passing it over charcoal at 600° C., or by some other similar means, and the carbon disulfide can be recycled to the feed system.

Many alkylene oxide starting materials, such as ethylene oxide and propylene oxide, are readily available at a low price because they are manufactured on a large scale for conversion to polymers, antifreezes, lubricants, etc. Alkylene oxides not commercially available are easily prepared by epoxidation of the corresponding olefin derivatives. Carbon disulfide is commercially manufactured by the interaction of carbon and sulfur in an electric furnace.

By the practice of this invention, alkylene trithiocarbonates are produced in a manner superior to the present known methods of the art. No inorganic materials or solvents are involved which permits the recovery of product in excellent yield at a low cost. The process is especially adaptable to a continuous mode of operation.

The following examples will serve to illustrate specific embodiments of the invention.

EXAMPLE 1

This example illustrates the preparation of ethylene trithiocarbonate in a continuous manner. The reactor consists essentially of a jacketed, seventeen-foot, stainless steel tube having a volume of 2.7 liters in the reaction zone. A thermowell extends thirteen feet from the bottom of the reactor.

Ethylene oxide and carbon disulfide are pumped in separate streams into the bottom of the reactor which is maintained at a temperature of 150° C. and a pressure of about 300 p.s.i.g. The carbon disulfide feed stream contains approximately 0.5 percent by weight of triethylamine, based on the total weight of feeds. The feed rates are adjusted so that 2.5 moles of carbon disulfide are fed into the reactor for each mole of ethylene oxide and so that the residence time of the mixture in the reactor is about thirty minutes. The hot reaction mixture is continuously removed from the top of the reactor through a regulating valve and passed through a cooling system and into the middle of a continuous still column. Carbonyl sulfide (boiling point −50° C.) is taken off through the vent as the non-condensable gas. Unreacted ethylene oxide (boiling point 10° C.) is continuously removed overhead, and carbon disulfide (boiling point 46° C.) is removed about one-third of the way up the column. The separate ethylene oxide and carbon disulfide recovery materials are recycled to the respective feed systems. The crude, stripped ethylene trithiocarbonate is removed from the bottom of the still and is purified by high vacuum, continuous distillation.

EXAMPLE 2

A cold mixture of ethylene oxide (1.0 mole, 44.0 grams), carbon disulfide (2.5 moles, 190 grams) and trimethylamine catalyst (1.3 grams) is charged to a three-liter stainless steel pressure vessel. After purging with nitrogen, sufficient nitrogen is introduced to bring the vessel pressure up to 500 p.s.i.g. at a temperature of 0° C. The vessel is then rocked while it is heated at a temperature of 175° C. for a period of thirty minutes. The reaction mixture is cooled to about −10° C. and 90 grams of crystalline material is separated from the mixture by filtration. The crystalline material is recrystallized from boiling ethyl acetate and 80 grams of ethylene trithiocarbonate are recovered.

EXAMPLE 3

The procedure of Example 2 is repeated using modifications and variations of reaction conditions as tabulated in Table I.

*Table I*

REACTION OF ETHYLENE OXIDE WITH CARBON DISULFIDE [1]

| Molar Ratio, $CS_2$/Oxide | Moles Oxide | Wt. percent Trimethylamine | Reaction Temp., °C. | Time to Reaction Temp., Min. | Time at Reaction Temp., Min. | Ethylene Trithiocarbonate Yield, percent |
|---|---|---|---|---|---|---|
| 1.25 | 2 | 0.47 | 250 | 92 | 30 | 0 |
| 2.5 | 1 | 0.56 | 125 | -------- | 30 | 10 |
| 2.5 | 1 | 0.56 | 150 | -------- | 30 | 77 |
| 2.5 | 1 | 0.56 | 100 | 10 | 26 | 56 |
| 2.5 | 1 | 0.56 | 138 | -------- | 30 | 70 |
| 2.5 | 4 | 0.56 | 150 | 56 | 30 | 39 |
| 1 | 1 | 1 | 150 | 45 | 0 | 54 |
| 1 | 1 | 1 | 100 | 54 | 0 | 30 |
| 1 | 1 | 0 | 200 | 136 | 0 | 30 |

[1] Reaction is performed under 500 p.s.i.g. nitrogen (at 0° C.). Rocking is begun when reaction temperature is reached.

EXAMPLE 4

A mixture of propylene oxide (1.0 mole, 58 grams), carbon disulfide (2.5 moles, 190 grams) and trimethylamine catalyst (5.0 grams) is charged to a three-liter stainless steel pressure vessel. After nitrogen is introduced to bring the vessel pressure up to 500 p.s.i.g., the vessel is heated at a temperature of 193° C. to 211° C. for thirty minutes while rocking. The crude reaction product (220 grams) is washed with water, dried over anhydrous sodium sulfate and fractionated under reduced pressure to yield propylene trithiocarbonate as a viscous, golden-yellow liquid having a boiling point of 126° C. at a pressure of 3 millimeters of mercury. The infrared absorption spectrum of the refined product is identical to that of an authentic sample of propylene trithiocarbonate.

EXAMPLE 5

A mixture of styrene oxide (1.0 mole, 120 grams), carbon disulfide (2.5 moles, 190 grams) and trimethylamine catalyst (3.1 grams) is charged to a three-liter stainless steel pressure vessel. After nitrogen is introduced to bring the vessel pressure up to 500 p.s.i.g., the vessel is heated at a temperature of 146° C. to 164° C. for a period of thirty minutes. The crude reaction mixture is cooled to −14° C. and filtered to separate the yellow crystalline product. This material is washed twice with cold ethyl acetate and dried to yield 46 grams of styrene trithiocarbonate, M.P. 80° C. to 84° C.

EXAMPLE 6

A mixture of cyclohexane oxide (1.0 mole, 98 grams), carbon disulfide (2.5 moles, 190 grams) and trimethylamine catalyst (5.8 grams) is charged to a three-liter stainless steel pressure vessel. After the vessel pressure is brought up to 500 p.s.i.g. with nitrogen, the vessel is heated at a temperature of 186° C. to 199° C. for a period of thirty minutes with rocking. The crude reaction product is treated with 6 grams of acetic acid to neutralize the catalyst and distilled to remove excess carbon disulfide (174 grams). The residue (67 grams) is cooled and filtered, and the recovered solid is crystallized from ethanol to afford 6.5 grams of cyclohexane trithiocarbonate.

EXAMPLE 7

As in the previous examples, a mixture of 2.5 moles of carbon disulfide and 1 mole of ethylene oxide, and 2 percent by weight of one of the catalysts listed below, is charged into a stainless steel vessel placed under 500 p.s.i.g. nitrogen pressure and heated at 150° C. for a period of thirty minutes. The vessel is cooled, the contents discharged and chilled in a Dry Ice-acetone bath. A solid product is collected by filtration and recrystallized from ethyl acetate. The relative effectiveness of the various catalysts under the particular reaction conditions are indicated in the following tabulation:

| Catalyst: | Ethylene trithiocarbonate yield, percent |
|---|---|
| Triethylamine | 50 |
| Triethylenediamine | 52 |
| Pyridine | 5 |
| Ammonium chloride | 0 |

EXAMPLE 8

A mixture of allyl glycidyl ether (1.0 mole, 114 grams), carbon disulfide (2.5 moles, 190 grams) and trimethylamine catalyst (6.1 grams) is charged to a three-liter stainless steel pressure vessel. The vessel pressure is brought up to 500 p.s.i.g. with nitrogen and the reaction mixture is heated at a temperature of 150° C. to 160° C. for a period of one hour. The crude product (285 grams) is fractionated under reduced pressure and yields dark yellow (allyloxymethyl)ethylene trithiocarbonate having a B.P. of 69° C. to 79° C./0.6 millimeter of mercury, $n_D^{30}$ 1.6286, and the following elemental content:

*Analysis.*—Calc. for ($C_7H_{10}OS_3$): C, 40.75; H, 4.89; S, 46.61. Found: C, 41.75; H, 4.98; S, 44.06.

The infrared absorption spectrum is consistent with the assigned structure.

(Allyloxymethyl)ethylene trithiocarbonate is a valuable new compound which is useful as a chemical intermediate in the preparation of other derivatives, and as a plasticizer for various resins, and as a monomer in the preparation of novel polymers.

(Alkenyloxyalkyl)alkylene trithiocarbonates as a general class of compounds are made readily available by the practice of this invention. The (alkenyloxyalkyl)alkylene trithiocarbonates which are prepared with particular ease are those produced from alkylene oxides corresponding to the formula:

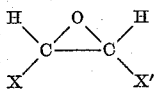

wherein X is selected from hydrogen, alkyl and —($C_mH_{2m}$)—O—($C_nH_{2n-1}$) radicals, and wherein X' is a —($C_mH_{2m}$)—O—($C_nH_{2n-1}$) radical; and said $m$ is an integer between 1 and 10, and said $n$ is an integer between 2 and 10.

What is claimed is:

1. Process for preparing trithiocarbonates which comprises reacting a member of the group consisting of alkylene oxides of the formulas

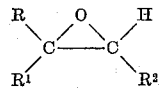

and

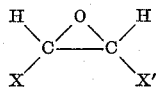

wherein R, $R^1$ and $R^2$ taken separately are of the group consisting of hydrogen, alkyl to 1 to 10 carbons, cyclopentyl, cyclohexyl and phenyl, and $R^1$ and $R^2$ taken together are cyclohexyl; X is of the group consisting of hydrogen, alkyl of 1 to 10 carbons and

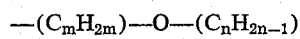

where $m$ is an integer from 1 to 10 and $n$ is an integer from 2 to 10; and X' is —($C_mH_{2m}$)—O—($C_nH_{2n-1}$) where $m$ and $n$ have the aforementioned significance, with a stoichiometric excess of carbon disulfide and as catalyst, 0.1 to 10 weight percent based on total weight of the alkylene oxide and carbon disulfide, a member of the group consisting of trialkylamine wherein each alkyl group has 1 to 4 carbons and triethylenediamine, in the absence of extraneous solvents, at a temperature between 5° C. and 250° C., and under a pressure sufficient to maintain the reactants in liquid phase.

2. The process of claim 1 wherein the catalyst is trialkylamine of 1 to 4 carbons in each alkyl.

3. The process of claim 1 wherein the catalyst is triethylenediamine.

4. The process of claim 1 wherein the alkylene oxide is ethylene oxide.

5. The process of claim 1 wherein the alkylene oxide is allyl glycidyl ether.

6. The process of claim 1 wherein the alkylene oxide is styrene oxide.

References Cited in the file of this patent

UNITED STATES PATENTS

| 2,193,415 | Coltof | Mar. 12, 1940 |
| 2,647,129 | Bashour | July 28, 1953 |
| 2,684,977 | Viard | July 27, 1954 |

FOREIGN PATENTS

| 838,171 | France | Nov. 28, 1938 |
| 1,104,014 | France | June 8, 1955 |
| 496,290 | Great Britain | Nov. 29, 1938 |
| 760,966 | Great Britain | Nov. 7, 1956 |

OTHER REFERENCES

Mills et al.: Journal of the Chemical Society (1931), page 540.

Culvenor et al.: Chemical Abstracts, volume 41, page 1608e (1947).